(12) United States Patent
Lee et al.

(10) Patent No.: US 10,284,811 B1
(45) Date of Patent: May 7, 2019

(54) RESISTANCE-TYPE SPLITTING APPARATUS

(71) Applicant: CABLE VISION ELECTRONICS CO., LTD, New Taipei (TW)

(72) Inventors: Chien-Chung Lee, New Taipei (TW); Mao-Peng Yu, New Taipei (TW); Ming-Da Peng, New Taipei (TW)

(73) Assignee: CABLE VISION ELECTRONICS CO., LTD, New Taipei (TW)

( * ) Notice: Subject to any disclaimer, the term of this patent is extended or adjusted under 35 U.S.C. 154(b) by 0 days.

(21) Appl. No.: 15/959,165

(22) Filed: Apr. 20, 2018

(30) Foreign Application Priority Data

Mar. 19, 2018 (TW) .............................. 107203512 U

(51) Int. Cl.
*H04N 21/426* (2011.01)
*H04N 21/61* (2011.01)
*H04N 7/10* (2006.01)

(52) U.S. Cl.
CPC ........... *H04N 7/104* (2013.01); *H04N 21/426* (2013.01); *H04N 21/6118* (2013.01); *H04N 21/6168* (2013.01)

(58) Field of Classification Search
CPC ............. H04N 21/426; H04N 21/6118; H04N 21/6168; H04N 7/104
See application file for complete search history.

(56) References Cited

U.S. PATENT DOCUMENTS

2013/0342281 A1* 12/2013 Alkan ..................... H03H 7/48
333/100
2016/0315597 A1* 10/2016 Rijssemus .............. H04N 7/104

* cited by examiner

*Primary Examiner* — Randy A Flynn
(74) *Attorney, Agent, or Firm* — Chun-Ming Shih; HDLS IPR Services

(57) ABSTRACT

A resistance-type splitting apparatus includes a transformer and a resistor distribution circuit. The resistor distribution circuit is electrically connected to the transformer. The resistor distribution circuit includes a plurality of distribution resistors. The distribution resistors are electrically connected to the transformer. The distribution resistors of the resistor distribution circuit are arranged as a radial pattern. The transformer receives a cable television signal. After the transformer receives the cable television signal, the transformer distributes the cable television signal through the distribution resistors. A transformer turns ratio of the transformer is adjusted to perform an impedance matching with the distribution resistors of the resistor distribution circuit.

10 Claims, 3 Drawing Sheets

RESISTANCE-TYPE SPLITTING APPARATUS

BACKGROUND OF THE INVENTION

Field of the Invention

The present invention relates to a splitting apparatus, and especially relates to a resistance-type splitting apparatus.

Description of the Related Art

Currently, the cable television system is very popular. The cable television system transmits television programs and network signals to client sides through coaxial cables. The client sides can use multimedia over coax alliance (which is usually abbreviated as MoCA) apparatuses so that a plurality of rooms have the network signals to use at the same time.

The related art cable television system needs to use the splitter to distribute signals to the client sides. However, the related art splitter used in the cable television area is manufactured with the—ferrite core which is wound by wires. It has high energy loss and bad frequency response at high frequency (for example, above 1 GHz), which influence the quality of the signals. If the stages are more, the influence is more serious. Moreover, although the frequency response of the related art pure-resistance-type splitting circuit is better, it still has higher energy loss.

SUMMARY OF THE INVENTION

In order to solve the above-mentioned problems, an object of the present invention is to provide a resistance-type splitting apparatus.

In order to achieve the object of the present invention mentioned above, the resistance-type splitting apparatus of the present invention comprises a transformer and a resistor distribution circuit. The resistor distribution circuit is electrically connected to the transformer. Moreover, the resistor distribution circuit comprises a plurality of distribution resistors. The distribution resistors are electrically connected to the transformer. Moreover, the distribution resistors of the resistor distribution circuit are arranged as a radial pattern. The transformer is configured to receive a cable television signal. After the transformer receives the cable television signal, the transformer is configured to distribute the cable television signal through the distribution resistors. Moreover, a transformer turns ratio of the transformer is configured to be adjusted to be configured to perform an impedance matching with the distribution resistors of the resistor distribution circuit.

Moreover, in the resistance-type splitting apparatus mentioned above, the resistor distribution circuit further comprises a plurality of matched resistors. The matched resistors are electrically connected to the distribution resistors. Moreover, the transformer turns ratio of the transformer is configured to be adjusted to be configured to perform the impedance matching with the distribution resistors and the matched resistors of the resistor distribution circuit.

Moreover, in the resistance-type splitting apparatus mentioned above, resistance values of the distribution resistors are the same, so that the transformer is configured to equally (namely, evenly or averagely) distribute the cable television signal through the distribution resistors.

Moreover, in the resistance-type splitting apparatus mentioned above, resistance values of the matched resistors are the same, so that the transformer is configured to equally (namely, evenly or averagely) distribute the cable television signal through the distribution resistors.

Moreover, in the resistance-type splitting apparatus mentioned above, the resistance values of the distribution resistors are configured to be adjusted to be configured to adjust isolations between a plurality of output sides of the resistor distribution circuit.

Moreover, in the resistance-type splitting apparatus mentioned above, the resistance values of the distribution resistors and the resistance values of the matched resistors are configured to be adjusted to be configured to adjust the isolations between a plurality of the output sides of the resistor distribution circuit.

Moreover, in the resistance-type splitting apparatus mentioned above, the distribution resistors and the matched resistors of the resistor distribution circuit are arranged as the radial pattern, so that the transformer is configured to equally (namely, evenly or averagely) distribute the cable television signal through the distribution resistors.

Moreover, in the resistance-type splitting apparatus mentioned above, the resistor distribution circuit further comprises a plurality of the output sides. The output sides are electrically connected to the distribution resistors, the matched resistors and a plurality of user side apparatuses. Moreover, the distribution resistors and the matched resistors of the resistor distribution circuit are configured to impedance match with the user side apparatuses.

Moreover, in the resistance-type splitting apparatus mentioned above, the cable television signal is a multimedia over coax alliance signal.

The advantages of the present invention is to reduce the energy loss of the splitter used in the cable television area, and to improve the frequency response of the splitter used in the cable television area.

Please refer to the detailed descriptions and figures of the present invention mentioned below for further understanding the technology, method and effect of the present invention. The figures are only for references and descriptions, and the present invention is not limited by the figures.

DETAILED DESCRIPTION OF THE INVENTION

Figure 1:
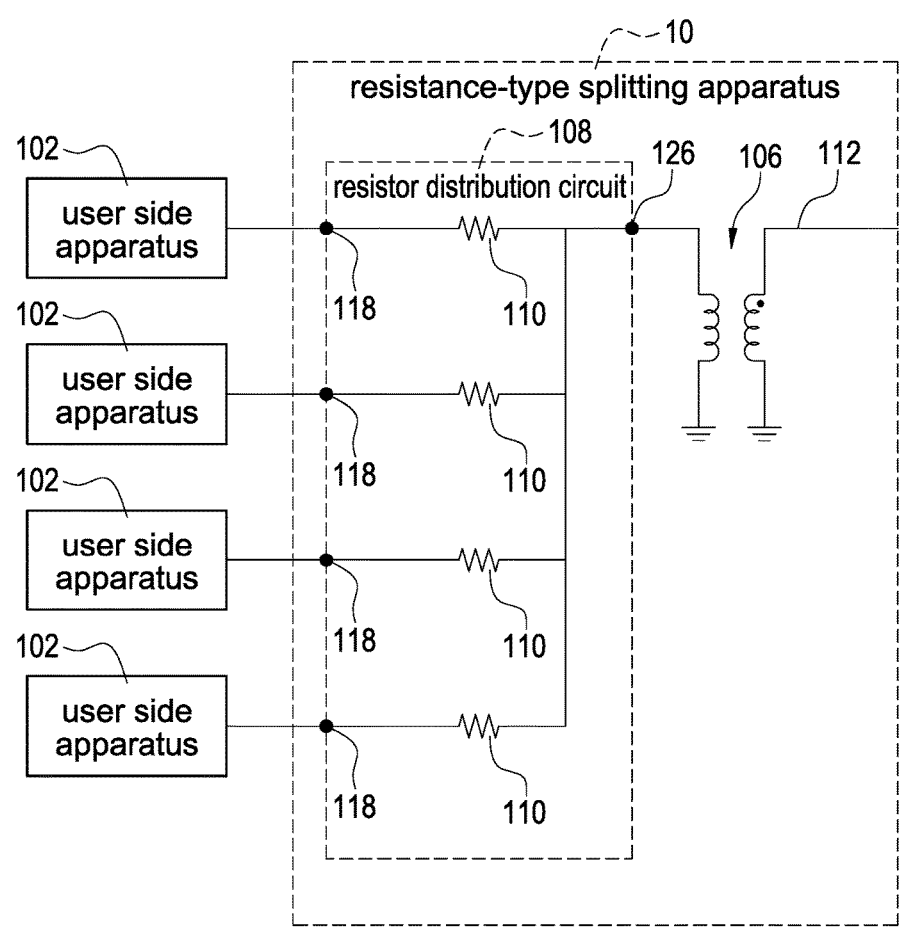
FIG. 1 shows a circuit block diagram of the first embodiment of the resistance-type splitting apparatus of the present invention.

In the present disclosure, numerous specific details are provided, to provide a thorough understanding of embodiments of the invention. Persons of ordinary skill in the art will recognize, however, that the present invention can be practiced without one or more of the specific details. In other instances, well-known details are not shown or described to avoid obscuring aspects of the present invention. Please refer to following detailed description and figures for the technical content of the present invention:

FIG. 1 shows a circuit block diagram of the first embodiment of the resistance-type splitting apparatus of the present invention. A resistance-type splitting apparatus 10 comprises a transformer 106 and a resistor distribution circuit 108. The resistor distribution circuit 108 is electrically connected to the transformer 106. The resistor distribution circuit 108 comprises a plurality of distribution resistors 110, a plurality of output sides 118 and an input side 126. The distribution resistors 110 are electrically connected to the transformer 106. The output sides 118 are electrically connected to the distribution resistors 110 and a plurality of user side apparatuses 102. The input side 126 is electrically connected to the distribution resistors 110 and the transformer 106.

The transformer 106 receives a cable television signal 112. After the transformer 106 receives the cable television signal 112, the transformer 106 distributes the cable television signal 112 through the distribution resistors 110 to the user side apparatuses 102. Moreover, the cable television signal 112 is, for examples but not limited to, a video signal, an audio signal, a data signal or a multimedia over coax alliance (which is usually abbreviated as MoCA) signal.

The distribution resistors 110 of the resistor distribution circuit 108 are arranged as a radial pattern, and resistance values of the distribution resistors 110 are the same (for example, 45 Ohms), so that the transformer 106 equally (namely, evenly or averagely) distributes the cable television signal 112 through the distribution resistors 110 to the user side apparatuses 102.

In an embodiment, the resistance values of the distribution resistors 110 are adjusted to adjust isolations between the output sides 118 of the resistor distribution circuit 108. A transformer turns ratio of the transformer 106 is adjusted to perform an impedance matching with the distribution resistors 110 of the resistor distribution circuit 108. For example, if the resistance value of each of the distribution resistors 110 is 45 Ohms and a resistance value of each of the user side apparatuses 102 is 75 Ohms, then in FIG. 1, the calculation of the left side impedance of the transformer 106 is: (45+75)/4=30 Ohms.

Figure 2:
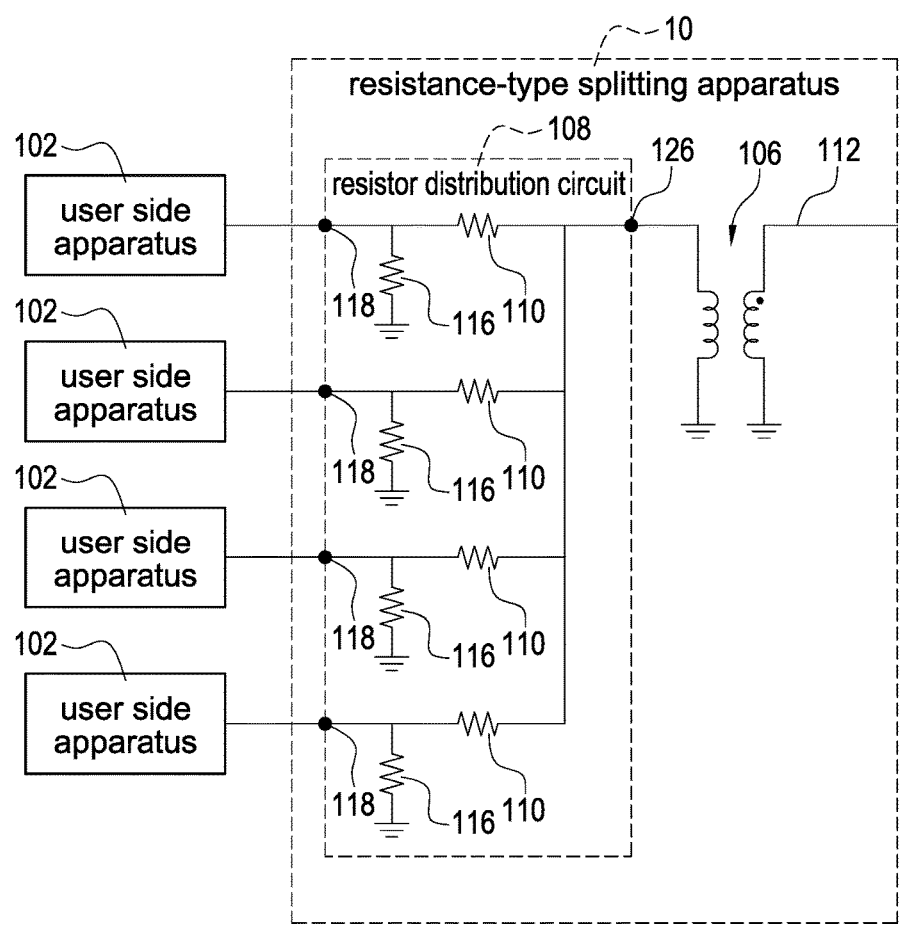
FIG. 2 shows a circuit block diagram of the second embodiment of the resistance-type splitting apparatus of the present invention.

FIG. 2 shows a circuit block diagram of the second embodiment of the resistance-type splitting apparatus of the present invention. The descriptions of the elements shown in FIG. 2 which are the same as the elements shown in FIG. 1 are not repeated here for brevity. The resistor distribution circuit 108 further comprises a plurality of matched resistors 116. The matched resistors 116 are electrically connected to the distribution resistors 110, the output sides 118 and the user side apparatuses 102.

The distribution resistors 110 and the matched resistors 116 of the resistor distribution circuit 108 are arranged as the radial pattern, and the resistance values of the distribution resistors 110 are the same (for example, 120 Ohms), and resistance values of the matched resistors 116 are the same (for example, 200 Ohms), so that the transformer 106 equally (namely, evenly or averagely) distributes the cable television signal 112 through the distribution resistors 110 to the user side apparatuses 102.

In an embodiment, the resistance values of the distribution resistors 110 and the resistance values of the matched resistors 116 are adjusted to adjust the isolations between the output sides 118 of the resistor distribution circuit 108. The transformer turns ratio of the transformer 106 is adjusted to perform the impedance matching with the distribution resistors 110 and the matched resistors 116 of the resistor distribution circuit 108. The distribution resistors 110 and the matched resistors 116 of the resistor distribution circuit 108 impedance match with the user side apparatuses 102.

Figure 3:
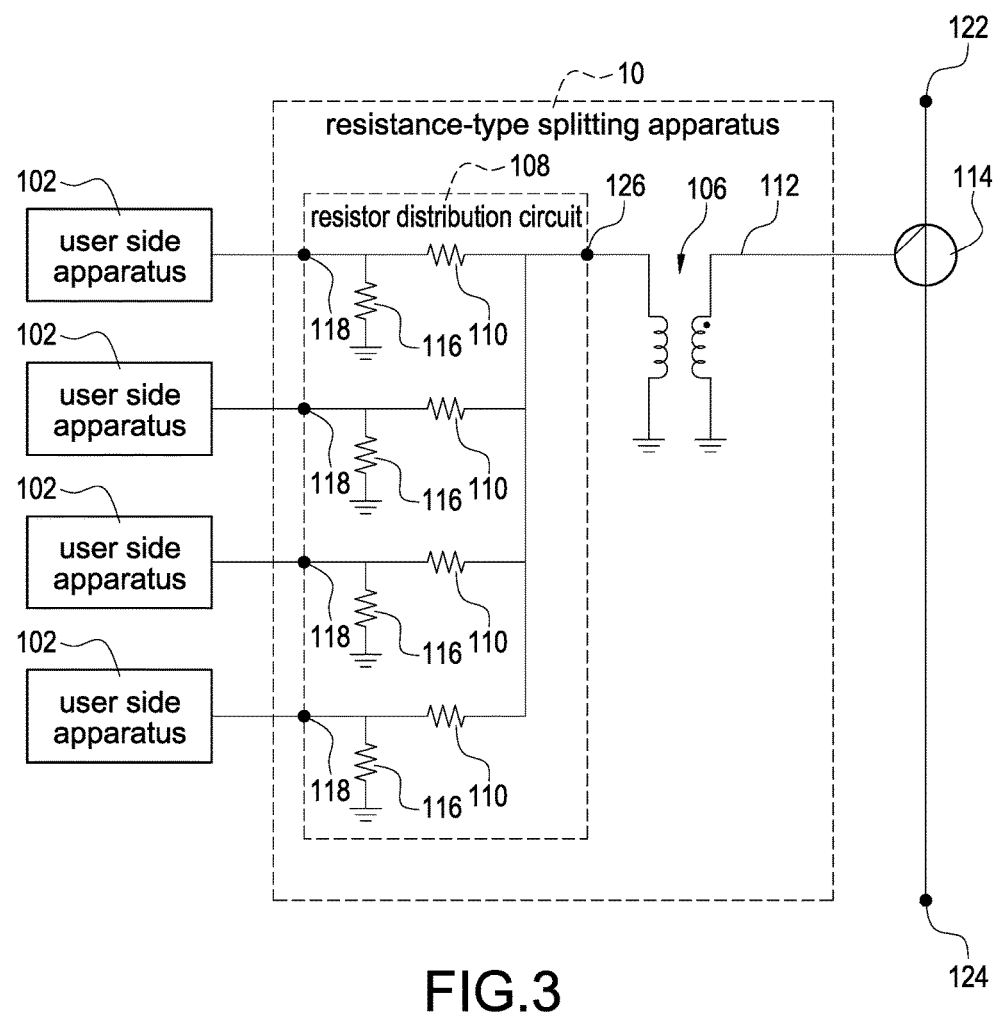
FIG. 3 shows a circuit block diagram of the third embodiment of the resistance-type splitting apparatus of the present invention.

FIG. 3 shows a circuit block diagram of the third embodiment of the resistance-type splitting apparatus of the present invention. The descriptions of the elements shown in FIG. 3 which are the same as the elements shown in FIG. 1 and FIG. 2 are not repeated here for brevity. The transformer 106 of the resistance-type splitting apparatus 10 is connected to a directional coupler 114. The directional coupler 114 is connected to a cable television signal input side 122 and a cable television signal output side 124.

If the working frequency is higher and the stages are more, using the resistance-type splitter can have better frequency response. If the resistance-type splitter is in an ideal matching, the loss of each of the resistor paths is the same. For example, the loss between the input and any output is equal to the loss between the outputs. In fact, the circuit designer will hope that the loss between the input and any output is smaller, and the loss between the outputs is larger (namely, isolation between the outputs is higher). At this time, the input resistor will be adjusted to be lower, and (or) the output resistor will be adjusted to be higher. When the resistors are adjusted to obtain desired loss, the return loss of the input and the return loss of the output are already very bad (namely, the impedance is not well matched).

In order to solve the problem mentioned above, the present invention further utilizes the transformer 106 to replace the input resistor. The wire wrapping ratio between the primary side and the secondary side of the transformer 106 is adjusted, so that the input impedance matches the output impedance. Although the transformer is usually also manufactured by wire wrapping, but it has only one stage, so the problem of uneven frequency response can be controlled and improved easily. Moreover, adjusting the output resistors and the transformer may not meet some designs, so the present invention further utilizes the matched resistors 116 to achieve better impedance matching.

The advantages of the present invention is to reduce the energy loss of the splitter used in the cable television area, and to improve the frequency response of the splitter used in the cable television area.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A resistance-type splitting apparatus comprising:
   a transformer; and
   a resistor distribution circuit electrically connected to the transformer,
   wherein the resistor distribution circuit comprises:
   a plurality of distribution resistors electrically connected to the transformer,
   wherein the distribution resistors of the resistor distribution circuit are arranged as a radial pattern; the transformer is configured to receive a cable television signal; after the transformer receives the cable television signal, the transformer is configured to distribute the cable television signal through the distribution resistors;
   wherein a transformer turns ratio of the transformer is configured to be adjusted to be configured to perform an impedance matching with the distribution resistors of the resistor distribution circuit.

2. The resistance-type splitting apparatus in claim 1, wherein the resistor distribution circuit further comprises:

a plurality of matched resistors electrically connected to the distribution resistors,
wherein the transformer turns ratio of the transformer is configured to be adjusted to be configured to perform the impedance matching with the distribution resistors and the matched resistors of the resistor distribution circuit.

3. The resistance-type splitting apparatus in claim 1, wherein resistance values of the distribution resistors are the same, so that the transformer is configured to equally distribute the cable television signal through the distribution resistors.

4. The resistance-type splitting apparatus in claim 2, wherein resistance values of the matched resistors are the same, so that the transformer is configured to equally distribute the cable television signal through the distribution resistors.

5. The resistance-type splitting apparatus in claim 1, wherein resistance values of the distribution resistors are configured to be adjusted to be configured to adjust isolations between a plurality of output sides of the resistor distribution circuit.

6. The resistance-type splitting apparatus in claim 2, wherein resistance values of the distribution resistors and resistance values of the matched resistors are configured to be adjusted to be configured to adjust isolations between a plurality of output sides of the resistor distribution circuit.

7. The resistance-type splitting apparatus in claim 4, wherein the distribution resistors and the matched resistors of the resistor distribution circuit are arranged as the radial pattern, so that the transformer is configured to equally distribute the cable television signal through the distribution resistors.

8. The resistance-type splitting apparatus in claim 7, wherein the resistor distribution circuit further comprises:
 a plurality of output sides electrically connected to the distribution resistors, the matched resistors and a plurality of user side apparatuses,
 wherein the distribution resistors and the matched resistors of the resistor distribution circuit are configured to impedance match with the user side apparatuses.

9. The resistance-type splitting apparatus in claim 3, wherein the cable television signal is a multimedia over coax alliance signal.

10. The resistance-type splitting apparatus in claim 7, wherein the cable television signal is a multimedia over coax alliance signal.

* * * * *